United States Patent [19]
Hopkins et al.

[11] Patent Number: 5,442,562
[45] Date of Patent: Aug. 15, 1995

[54] METHOD OF CONTROLLING A MANUFACTURING PROCESS USING MULTIVARIATE ANALYSIS

[75] Inventors: Robert W. Hopkins; Paige Miller; Ronald E. Swanson, all of Rochester; John J. Scheible, Fairport, all of N.Y.

[73] Assignee: Eastman Kodak Company, Rochester, N.Y.

[21] Appl. No.: 165,155

[22] Filed: Dec. 10, 1993

[51] Int. Cl.$^6$ .............................................. G05B 13/02
[52] U.S. Cl. .................................... 364/468; 364/148; 364/151
[58] Field of Search ............................... 364/148–152, 364/157–158, 160–163, 468, 401–403

[56] References Cited

U.S. PATENT DOCUMENTS

| | | | |
|---|---|---|---|
| 4,674,028 | 6/1987 | Shioya et al. | 364/148 |
| 4,791,548 | 12/1988 | Yoshikawa et al. | 364/149 |
| 4,882,526 | 11/1989 | Iino et al. | 364/148 |
| 5,038,269 | 8/1991 | Grimble et al. | 364/148 |
| 5,060,132 | 10/1991 | Beller et al. | 364/158 |

OTHER PUBLICATIONS

B. M. Wise, N. L. Ricker, D. F. Veltkamp and B. R. Kowalski, "A theoretical basis for the use of principal component models for monitoring multivariate processes", *Process control and quality*, 1(1990) pp. 41–51.

M. Stone and R. J. Brooks, "Continuum Regression: Cross-validated Sequentially Constructed Prediction Embracing Ordinary Least Squares, Partial Least Squares and Principal Components Regression", *Journal of the Royal Statistical Society*, B(1990) 52, No. 2, pp. 237–269.

*Primary Examiner*—Roy N. Envall, Jr.
*Assistant Examiner*—Thomas E. Brown
*Attorney, Agent, or Firm*—Thomas H. Close

[57] ABSTRACT

In a manufacturing process using multivariate analysis for statistical process control, data representing a plurality of process and/or product variables is collected during operation of the process. A surrogate variable, representing the overall state of the process is evaluated. The surrogate variable is a function of a plurality of intermediate variables, which in turn are a function of the process and/or product variables. When the value of the surrogate variable is outside of a predetermined limit, the contributions to the surrogate variable by the intermediate variables are calculated. The intermediate variable with the largest contribution is identified and the contributions to the identified intermediate variable by the process variables is calculated., The process variables with the largest contribution to the identified intermediate variable are identified, and used to diagnose and correct the problem with the process.

18 Claims, 12 Drawing Sheets

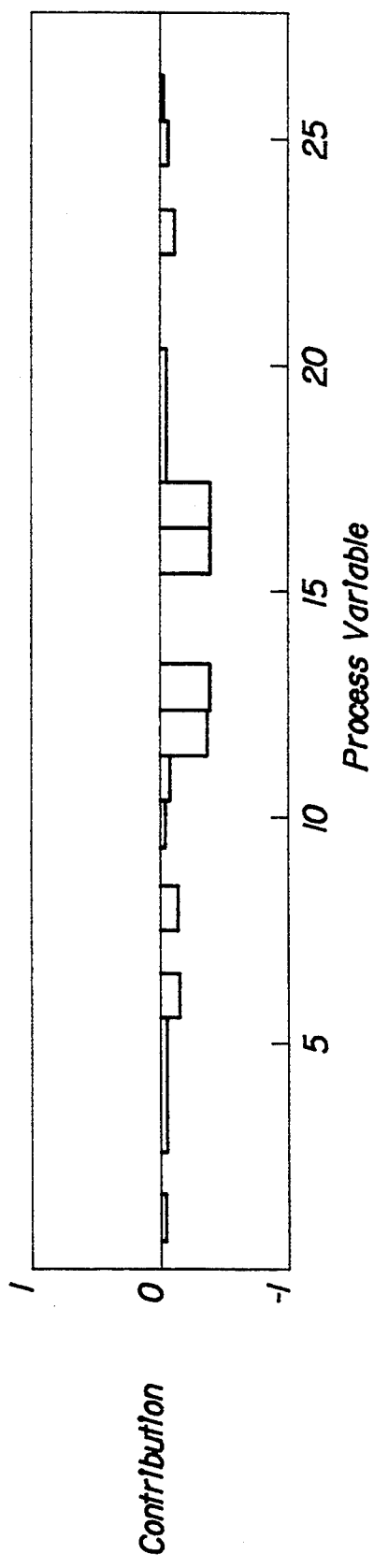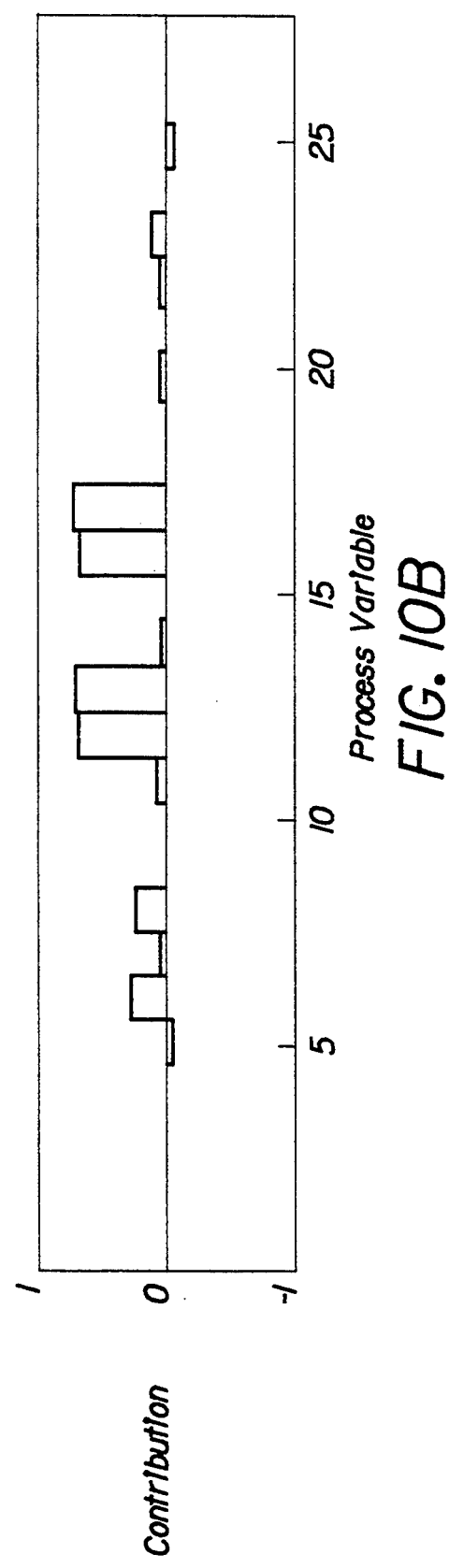

METHOD OF CONTROLLING A MANUFACTURING PROCESS USING MULTIVARIATE ANALYSIS

FIELD OF INVENTION

The invention relates to manufacturing process control, and more particularly to methods of manufacturing process control employing multivariate quality control techniques.

BACKGROUND OF THE INVENTION

The most commonly used type of statistical process control (SPC) employs single variable (univariate) control charts that record the values of process product variables and indicate when a given process or product variable is outside some predetermined limit. This approach however is not practical when the number of process variables becomes very large (e.g. greater than 20), or when the process variable interact, such as in a chemical manufacturing process. Techniques for monitoring a process having a large number of process variables or where the process variables interact are known as multivariate quality control techniques. Applications of multivariate quality control are generally aimed at detecting two major sources of process and/or product variability. They are: (1) sensor inaccuracies or failures; and (2) raw material and/or manufacturing process changes that result in shifts in the dynamics that are driving the process. One form of multivariate analysis is known as Principal Component Analysis (PCA). See Wise, B. M., Ricker, N. L., Veltkamp, D. F. and Kowalski, B. R. (1990), "A theoretical basis for the use of principal components models for monitoring multivariate processes", *Process Control and Quality*, 1, 4151). Wise et. al. have shown that both sensor failures and process changes can be detected via multivariate analysis. Wise et al have specifically shown that an arbitrary dynamic linear time invariant state-space model can always be transformed so that the states are directly related to the PCA scores. In addition, they emphasized that multivariate analysis is most effective when the process has significantly more measurements than states (a situation that frequently occurs)., and that for a given dynamic process, either an increase in the measurements or an increase in the sampling period will usually make multivariate analysis appropriate for identifying when a process is out of control. PCA is generally used when controlling manufacturing processes using process data alone.

Another multivariate technique called Partial Least Squares (PLS) is employed when both process and product data are used to control the process. See Stone, M. and Brooks, R. J. (1990). "Continuum Regression: Cross-validated Sequentially Constructed Prediction Embracing Ordinary Least Squares, Partial Least Squares and Principal Components Regression", *Journal of the Royal Statistical Society B*, 52, 237–269.

Conventional multivariate analysis techniques involve forming and analyzing a small set (e.g. two) surrogate variables that represent the state of the process and by their values indicate when the process is in or out of control. Although it has been possible to effectively identify when a process is out of control using these multivariate analysis techniques, it is often difficult to determine the source of the problem, particularly as the number of process variable increases.

SUMMARY OF THE INVENTION

The present invention is directed to overcoming the problem set forth above. Briefly summarized, according to one aspect of the present invention, a manufacturing process is controlled by the steps of: collecting data representative of a plurality of process and/or product variables during the operation of the process; using multivariate analysis, generating a surrogate variable having a value representative of whether or not the process is in control, the surrogate variable being a function of a plurality of intermediate variables, each of the intermediate variables being a weighted function of the process or product variables; when the value of the surrogate variable indicates that the process is out of a predetermined limit, determining which of the intermediate variables primarily contributed to the value of the surrogate variable; for the intermediate variable determined in the previous step, identifying which of the process variables primarily contributed to the value of the determined intermediate variable; and modifying the process to change the process variable identified in the previous step to bring the process into the predetermined limit.

The present invention is advantageous over the prior art for the following reasons:

1) Multivariate statistics can detect multivariate outliers, but do not readily indicate which process variable are out of control. Process variable control charts are useful in indicating which process variable is out of control but do not detect multivariate outliers. The method of the present invention detects multivariate outliers and also indicates which process variables contributed to the out of control condition.

2) Univariate control charts of a process having many variables give misleading information (i.e. false signals). These false signals quickly make operators lose faith in the charts. For example, suppose a process had ten variables that were approximately mutually independent (possibly included in a larger set of correlated variables) that were all in control with $2\sigma$ control limits. The probability that any of these 10 variables is within its $\pm 2\ \sigma$ limits is approximately 95%. The probability that all are within the limits is $95\%^{10}=60\%$ (assuming independence of all 10 variables). Thus there is a 40% chance that at least one variable will exceed its $\pm 2\sigma$ limits, when, in truth, all variables are in control. Multivariate methods avoid this difficulty but don't indicate which process variable is the cause of the problem. The present invention provides a method for directly identifying the source of the problem.

3) When the process being controlled is a batch process, such as in photographic emulsion making, control charts focus on one variable across all batches. The method of the present invention focuses on all variables for one batch (or an aggregation of several batches). Thus interpreting what problems exist in the data for a batch (or aggregation of batches) is easily done from the method of the present invention, but is not easily done from control charts.

4) The use of multivariate statistics with the method of the present invention allows all of the variables collected to be used in an investigation. It allows the engineer to resist the urge to keep the number of variables down to a manageable number (in our experience manageable means 5–10 variables). This is important for two reasons. First, variables are often left out of an analysis due to engineering judgment that they are not as important as other variables; however, if the process should unexpectedly change, it may become an important variable.

These and other aspects, objects, features and advantages of the present invention will be more clearly understood and appreciated from a review of the following detailed description of the preferred embodiments and appended claims, and be reference to the accompanying drawings.

BRIEF DESCRIPTION OF THE DRAWINGS

FIG. 10 is a contribution plot of average intermediate variable values form the identified cluster in FIG. 9;

DESCRIPTION OF THE PREFERRED EMBODIMENTS

Figure 1:
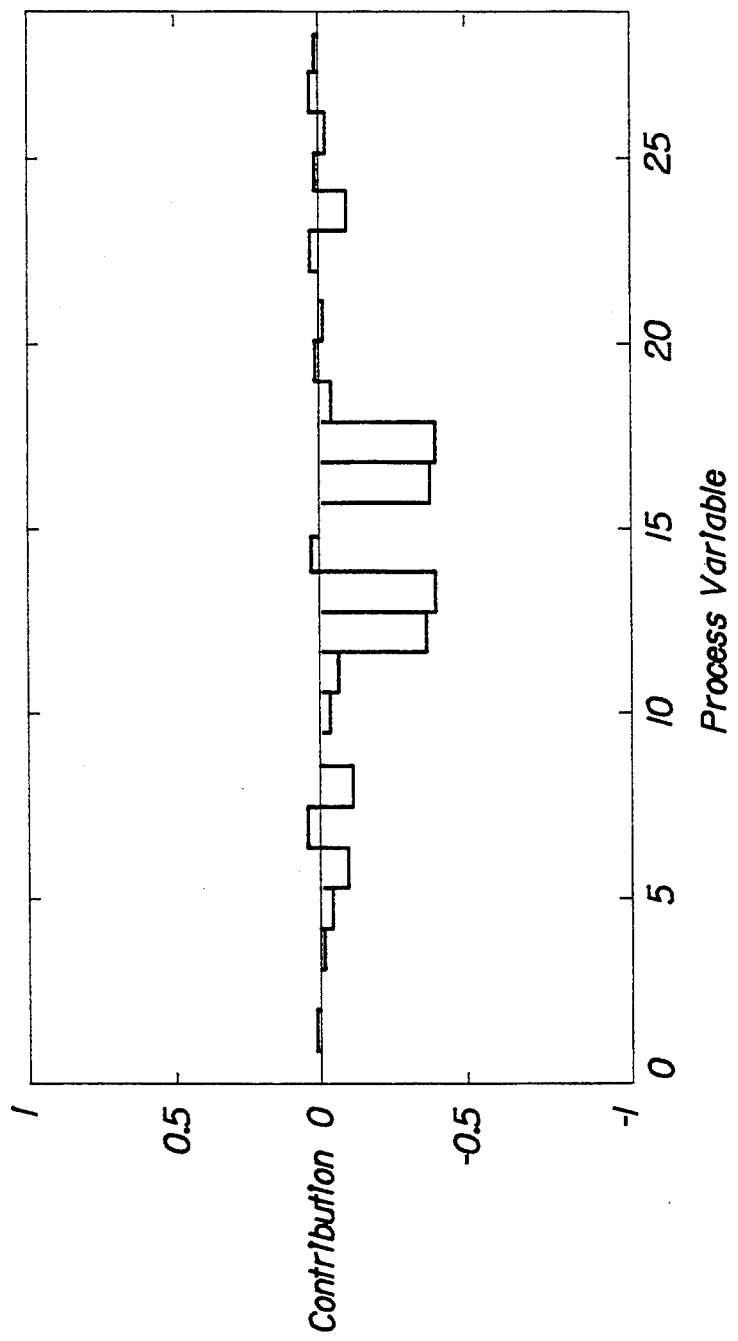
FIG. 1 is an exemplary contribution plot for an intermediate variable useful in practicing the method of the present invention.

The invention will be described in the context of a photographic emulsion manufacturing process, however it will be understood that the present invention can be employed with any manufacturing process.

Notation

As in any SPC application, we begin with a set of n observations that are representative of the behavior of the process and that will be used as the basis (a training set or historical reference distribution) for an SPC model. This model is used to monitor future observations, as well as to detect special causes in the original n observations. For the $i^{th}$ observation there are p process variables (such as temperature, pressures, flows, etc.) denoted by the (row) p-vector $x_i$. If product characteristics (such as grain size, photographic properties, hardness, etc.) are to be used, there are also q product variables denoted by the (row) q-vector $y_i$ for the same observation. The entire collection of n observations is denoted by the nxp matrix X and the nxq matrix Y.

Preprocessing the Data

Without loss of generality, we shall assume that the columns of the data matrices X and Y have been mean-centered. This simplifies the notation considerably. It is customary to scale the data by dividing the columns of the data matrices by the standard deviations of each variable, thereby avoiding the complications associated with having different units. The selection of scaling factors for the variables should be made thoughtfully since PCA and PLS are not scale-invariant.

PCA and PLS Background

The method of determining contributions to the surrogate and intermediate variables according to the present invention depend on whether PCA or PLS is being implemented. These two techniques are closely related: both represent many original variables in terms of a smaller number of derived intermediate variables that are, in a certain sense, "representative" of important features of the data, and an even smaller number (e.g. two) of surrogate variables that are representative of the state of the overall process.

In Principal Components Analysis (PCA), we decompose X as $$X = \hat{X} + E \quad (1)$$

where $\hat{X}$ is a yet to be determined approximation for X and E is a matrix of residuals. From linear algebra concepts it is known that equation (1) can be written as $$X = TP' + E \quad (2)$$

where the orthonormal pxD matrix P is the set of coefficients known as loadings and T is an orthogonal nxD matrix of intermediate variables. D is the number of intermediate variables in the PCA analysis and $D \leq \text{rank}(X)$. We adopt the scaling convention $T'T = L$, where L is a diagonal matrix of the ordered eigenvalues of $X'X$. Very often, D is much smaller than rank(X), in which case T can be used as a lower-dimensional approximation to X, and then considerable time savings are achieved by working with T rather than with X. (T is actually an orthogonal projection of X onto P).

The values of the intermediate variables indicate where in each dimension (or direction through the data X) each point lies. The advantage of this approach is that it allows the data to be examined with D intermediate variables instead of p variables. We also define the quantity $T_i^2$ as a surrogate for observation i as:

$$T_i^2 = \sum_{d=1}^{D} \frac{t_{id}^2}{\sigma_d^2} \quad (3)$$

where $t_{id}$ is the $d^{th}$ intermediate variable for the $i^{th}$ observation and $\sigma_d$ is the standard deviation of the $d^{th}$ intermediate variable across all the observations.

The usual definition of $T^2$ involves using $D = \text{rank}(X)$, however we use only those intermediate variables selected for PCA analysis in our $T^2$ calculations ($D \leq \text{rank}(X)$). This lets $T^2$ react to those intermediate variables which are true process changes and not to those intermediate variables which are noise. $T^2$ is a single number which can be used to determine if the process is out-of-control for a given observation. PCA can be performed by many different statistical software packages and by many linear algebra packages as well. With the speed of today's computers, even relatively large data sets can be handled in a short amount of time. PCA-derived intermediate variables are the best D-dimensional representation of X in a least-squares sense. However, the relationship(s) between X and Y are not captured by PCA. Therefore, the intermediate variables may focus, to some extent, on information that isn't important to the control of the process. In these instances, it is desirable to de-emphasize process variables that don't impact Y. PLS is one way to do this. PLS is closely-related to PCA. However, the criterion upon which it is based is considerably more complicated. As before, we can write $$X = TP' + E \quad (4)$$

but, in this instance, the sum of squared residuals in E is not minimized. Instead, the quality characteristics in Y are brought to bear by defining a set of D-dimensional Y-scores U and loadings Q that satisfy $$Y = UQ' + F, \quad (5)$$

Where F is a matrix of residual values. To complete the model, the $d^{th}$ dimension of T and U are linearly related by the inner relation:

$$t_d = b_d u_d + g_d \quad (6)$$

where $b_d$ is the regression coefficient between the $x_d$ and $y_d$ scores, and g are residual errors. PLS uses a stepwise optimality criterion. The first column of P (corresponding to d=1) is chosen so that it maximizes the covariance between $t_1$ and $u_1$. Maximizing the squared covariance between $t_1$ and $u_1$ is a way of simultaneously fitting X and Y. This column can be obtained as the first eigenvector of $X'YY'X$. The residual matrices E and F are used in place of X and Y in the determination of the second (and subsequent) intermediate variables of P. Therefore, PLS determines linear combinations of X (and Y) that have maximal squared covariance in sequentially orthogonal subspaces of X.

Determination of the Number of Intermediate variables

In PCA, there are many different ways to choose the number D of intermediate variables $t_d$. One popular one is to choose the first D intermediate variables so that 95% of the total variability is explained. Another is the screen test, in which the eigenvalues $\lambda_i$ of $X'X$ are ordered in decreasing magnitude $\lambda_1 \geq \lambda_2 \geq \ldots \geq \lambda$ rank(X). The $\lambda_i$ are plotted on the y-axis and i on the x-axis. The location where the plot first exhibits constant slope indicates the number of intermediate variables to choose.

For PLS, the most common way to choose D is cross-validation. The general idea is to set aside a subset of the data, fit the model using the remaining data, and then predict the subset of data omitted. This is continued with other subsets being omitted, until each observation has been excluded exactly once. The number of intermediate variables at which the sum of the squared prediction errors is smallest is the value chosen for D.

Multivariate Contributions

We define the contribution and contribution plot according to the present invention, which can be used in either PCA or PLS. We define the contribution to $T^2$ as simply the $t_{id}\sigma_d$ values and we display these values for a given batch in a bar chart called the contribution plot. The contribution plot displays which intermediate variable(s) were contributors to the $T^2$ value being out of control. When $t_{id}/\sigma_d$ for $d = 1 \rightarrow D$ is plotted in a bar graph, the biggest bars indicate the intermediate variables of further interest. If intermediate variable d is selected via this process because it has the biggest bar (i.e. a large value), we then need to determine which of the original variables led to the value of the intermediate variable being large. Since the value for $i^{th}$ observation of the $d^{th}$ intermediate variable is computed from the formula $$t_{id} = x_i p_d = \sum_{j=1}^{p} x_{ij} p_{jd} \quad (7)$$

where $x_i$ is the i-th row of X, we can decompose $t_{id}$ into p terms $x_{ij}p_{jd}$ for $j=1, \ldots, p$. These are the contributions for the intermediate variable $t_{id}$. The contribution plot is a bar chart of these p contributions, scaled as indicated below, an example of which is shown in FIG. 1. The large values, either positive or negative, are the indicators of the original process or product variables that contributed most heavily to the score being large. As shown in FIG. 1, the variables that contribute most to this batch being unusual in intermediate variable 1 are process variables 12, 13, 16 and 17. Although control charts of the original data would confirm that for this batch, these variables were unusually large, it would be an impractical task to inspect each chart for a large number of variables, and the pattern of contributing variables will be indicative of a particular type of process failure that can be readily recognized in diagnosing future failures.

The contributions are the product of the loading times the data value and so the contributions may be large because either the loading $p_{jd}$ is large or the data value $x_{ij}$ is large (in terms of deviations from the mean), or a combination of both. Techniques based upon interpretation of the largest loadings, would miss the case where the loading was small or moderate and the data value was a huge deviation from the center.

Figure 2:
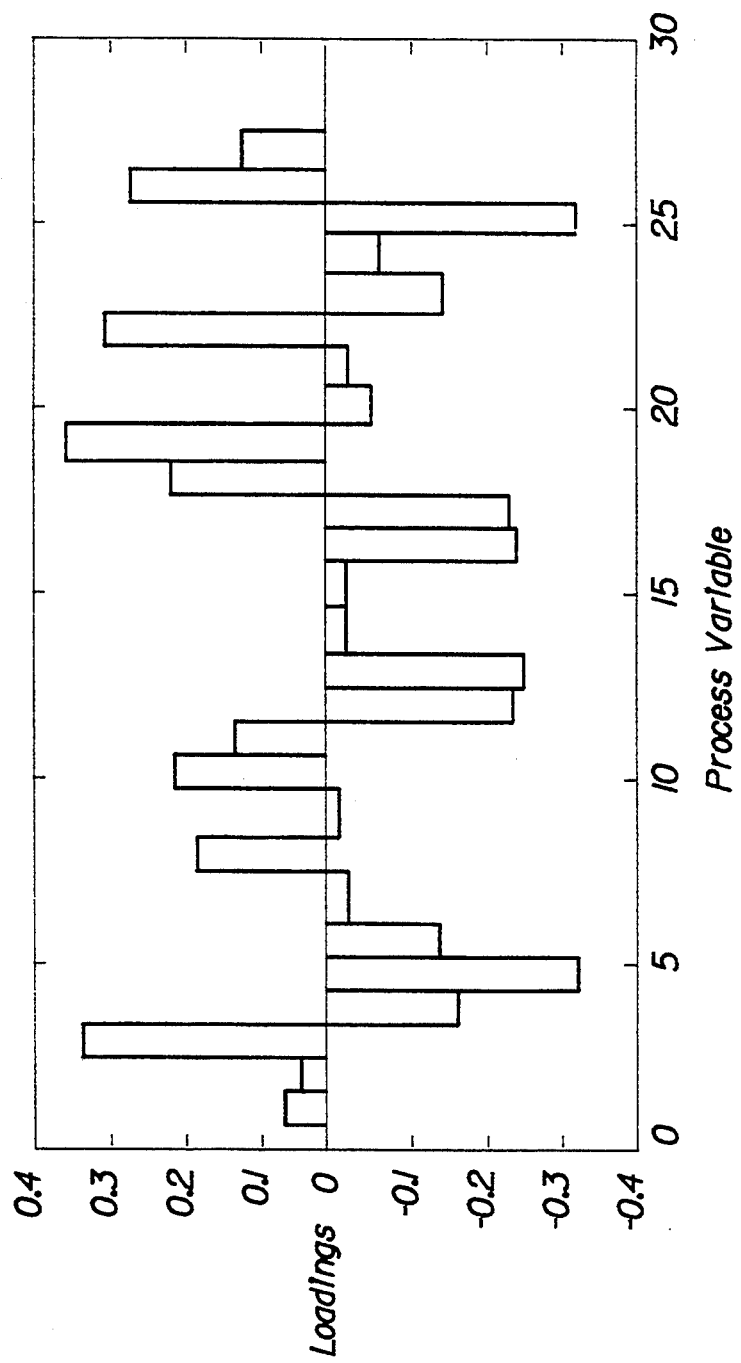
FIG. 2 is and exemplary plot of loading versus process variable useful in comparing the present invention to the prior art.

If we were to look at the loadings for intermediate variable 1, shown as a bar chart in FIG. 2, we would see that the variables identified in the contribution plot (FIG. 1) were not ones that had the biggest loadings (although the loadings were not close to zero either). Previous techniques focusing in on the largest loadings might have led an investigator astray regarding this particular batch, if the loadings for variables 12, 13, 16 and 17 had been left out of the interpretation. Using the loadings for variables 12, 13, 16 and 17 plus all bigger loadings, the interpretation would include variables not relevant to this batch. Again control charts of the variables with the highest loadings confirm that for this batch, the variables with biggest loadings were not unusual.

Previously, there was no $T^2$ concept in PLS, so we define $T^2$ analogously to PCA. Formula (3) can be used where the $t_{id}$ are the PLS scores for the X-block and $\sigma_d$ is the standard deviation of the PLS scores for the X-block. The score contributions in PLS are defined similarly to PCA using (7) except that the $x_{ij}$ are defined as residuals after the previous dimension if $d > 1$, and the centered and scaled data itself if $d = 1$. Scores for the Y-block in PLS use a loading vector denoted by $q_d$, and the $x_{ij}$ would be replaced with $y_{ij}$, where again if $d > 1$ the $y_{ij}$ values are residuals from the previous dimension and if $d = 1$ they are the centered and scaled data.

Thus with a few simple calculations, we can take any observation and determine which variables were unusual. A strategy for PCA or PLS is as follows—examine the $T^2$ value. If it is greater than the control limit, then conclude that there was something unusual about the observation; otherwise conclude that the observation was not unusual. If $T^2$ was greater than the control limit, then continue by computing the contribution plot for $T^2$. The contribution plot for $T^2$ will indicate which of the intermediate variables contributed to the out of limit value of $T^2$. Next, compute the contribution to the largest intermediate variables for the intermediate variables indicated by $T^2$ and this will indicate which of the process variables was unusual for this observation. Finally, the process is adjusted to change the values of the indicated process or product variables to bring the process under control. In a batch process, this may mean that the batch must be aborted, and the process started over again.

Contributions to groups of observations

The above discussion of contribution applies to a single observation in the data, but we can also apply the ideas to a set S of observations. This set may consist of a cluster of observations seen on a scatter plot of intermediate variable values, or it may be a sequence of observations that seem unusual in a time-sequence plot of the intermediate variable values. For example, we may see the values in time sequence drift up or down, or we may see a step-function change in the values. We would want to investigate the reasons for the clustering on a scatter plot or the reasons for the drift or step-function change in time-sequence.

To do so, we simply aggregate in some meaningful way the observations of interest. For example, we could use $$x_S = \sum_{i \in S} w_i x_i \qquad (7)$$

where the $w_i$ is a set of weights used for the aggregation of the different observations in S. Then the new vector $x_S$ can be used to compute a new intermediate variable or determine the contributions to the intermediate variable.

One way to choose the weights $w_i$ arises if we wish to find the average contribution of a group of n observations. Then $w_i = 1/n$ for all $i \in S$. This might be useful if we see a cluster of points on a scatter plot of the scores and we wish to determine what these points have in common. Usually such a cluster would not be centered around the origin, but would be away from the origin; then the contributions would give us the variables that are different from the mean that caused this set of batches to fall in a cluster away from the origin.

Similarly, if we detect a "step change" in the intermediate variable values when they are plotted in time sequence for a particular PCA or PLS dimension, then we might want to compare the average of the last $n_1$ batches before the step change to the average of the $n_2$ batches after the step change. The contributions in this case will tell us what variables have changed (as captured by this PLS or PCA dimension). In that case, the batches selected before the step change get weights $w_i = -1/n_1$ and the batches selected afterwards get weights $w_i = 1/n_2$.

We might detect a "drift" upwards or downwards in the scores for a particular dimension. In that case, we might want to determine what variables contribute to the drift. Again, the contributions based upon appropriate weights would answer this question. The weights chosen should estimate a slope in the original data. A set of weights that can be used to estimate a slope are the orthogonal polynomial coefficients for a linear polynomial (which are simply equally spaced values centered around zero). For example, if we had 10 points drifting up, the weights $w_i$ would be (in sequence) $k[-1 -7/9 -5/9 -3/9 -1/91/93/95/97/91]$, where k is any constant and quite simply can be set to 1. Similarly if one detected a quadratic trend, the second order orthogonal polynomial coefficients could be used. Clearly, the selection of $w_i$ can be quite problem specific. The ones presented above have been found to be very useful in our applications.

An alternative investigation strategy to the one mentioned earlier (start with a batch that has high $T^2$ and then investigate the scores for that batch) is to look for clusters in scatter plots of scores and trends or level shifts in time sequence plots of the scores. Often, clusters, trends or level shifts don't show up clearly in $T^2$ but can appear more prominently in sequence ordered plots of the scores. The two strategies are complimentary, and both should be followed when doing an investigation of the data.

Residual Contributions

Furthermore, we can apply the contribution idea to the residual statistic computed from either PCA or PLS. The residuals can be thought of as a second surrogate variable, or the unexplained variability in the original data after the PCA or PLS model has explained D intermediate variables. A large residual is a flag that something has happened in this batch that our model hasn't captured. Again, we ask, "Which of the original process variables contributes to this unusually large residual?" In engineering terms, a large residual may occur due to any of a number of reasons: data collection error, process disturbance that affected only a small percentage of the batches (and so did not show up in the D intermediate variables chosen for the model), or if the large residual occurs in a new batch (after the model has been fixed) it may represent a new process disturbance not seen in the data used to build the model.

We note that the PCA residual for observation i, known as the Squared Prediction Error, is calculated as:

$$SPE = (X - TP)'(X - TP) \qquad (8)$$

If we wish to find the contributions for the residuals to observation i then we simply would provide a bar chart of the p values of $x_i - t_i P'$. Any big bars would indicate the process or product variables for this observation that were not "predicted" well by PCA. It should be noted that for contributions to surrogate variable SPE, there are no intermediate variables in the same sense discussed above with respect to surrogate variable $T^2$. The contribution from the process or product variables are directly calculated.

In PLS, the algorithm actually provides residual matrices (one for the X-block and one for the Y-block) after the last dimension is computed. A single statistic for either the X-block or the Y-block could be computed as simply the sum of squares of the residual vector for observation i. An observation could have a large residual statistic in either X-block or the Y-block or both, and the contribution plots will indicate which of the variables is not modeled well. If there is more than one variable in the Y-block, then the contribution plot indicates which of the several responses was not well-predicted.

Scaling of Contributions for Plotting

We have used two different scaling methods for plotting the contributions to the values of the intermediate variables. The idea is to make the process or product variables with the biggest contributions stand out from the other variables. Both methods have been found to be useful. In a contribution plot, the two methods have the effect of either "zooming in" or "zooming out" on the plot, but leave the pattern of bar heights unchanged. The plots shown in the figures use method 1 below. Contributions to $T^2$ and SPE are not scaled.

Method 1—Maximum Score Scaling—for dimension d, we plot $x_{ij}P_{jd}/\max_{ij}|x_{ij}p_{jd}|$ for $j=1, \ldots, p$. In this way, we compare the contributions for batch i to the maximum, in absolute value, of the contributions for all of the batches. If the contribution for batch i is $\pm 1$, then this represents the largest deviation from the mean of all of the batches for this variable.

Method 2—Within Batch Scaling—for dimension d, we plot $x_{ij}p_{jd}/\Sigma_j|x_{ij}p_{jd}|$ for $j=1, \ldots, p$. The biggest bars in this method are truly the ones which contribute most to the score for this particular batch and the height of the bar is roughly the proportion of the variable's contribution (it would be exactly the proportion if all of the values $x_{ij}p_{jd}$ had the same sign).

Applications of Contribution Plots

Example 1—$T^2$ Contributions

Figure 3:
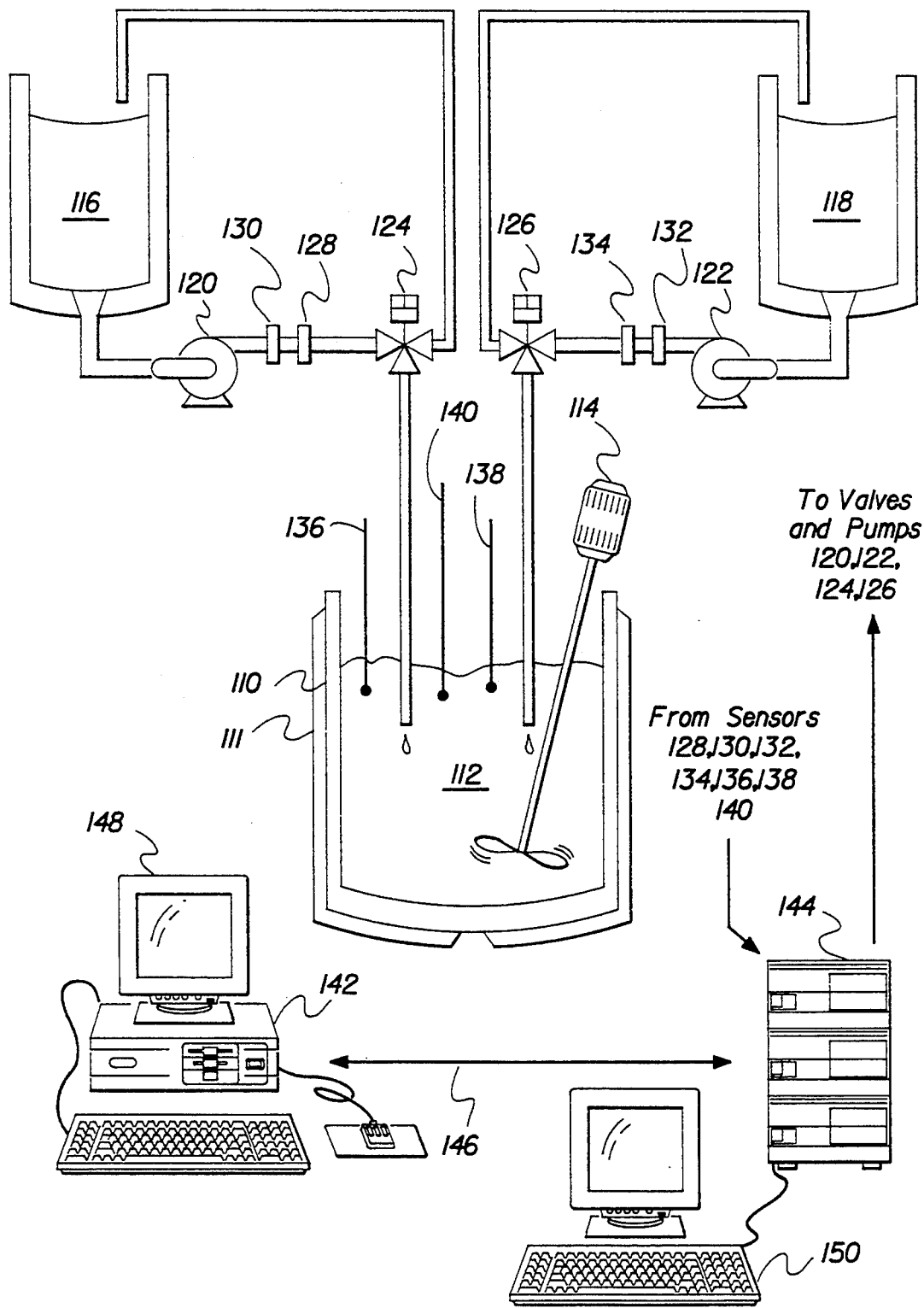
FIG. 3 is a schematic diagram of an emulsion precipitation process controlled by the method of the present invention.

The data used in the examples throughout this section is taken from an emulsion manufacturing process. The process is shown schematically in FIG. 3, where a photographic emulsion is prepared in a kettle 110. The kettle 110 is provided with a heating jacket 111, and the contents of the kettle are stirred by a stirring device 114. Silver nitrate solution from a source 116 and a salt solution from a source 118 are delivered through a silver pump 120 and a salt pump 122 through computer controlled valves 124 and 126 respectively. The flow rate and pressure of the silver solution are monitored by flow rate and pressure sensor 128 and flow sensor 130 respectively. The flow rate and pressure of th salt solution is monitored by flow rate and pressure sensors 132 and 134 respectively. The temperature, sliver concentration (vAg) and pH of the contents 112 of the kettle 110 are monitored by temperature, vAg, and PH sensors 136, 138, and 140 respectively. The output from all of the sensors 128-140 are supplied to a diagnostic computer 142 and a process control computer 122. Diagnostic Computer 142 and Process Control Computer 144 communicate via a data link 146. An operator control station including a display monitor 148 and an operator control panel 150 is connected to the Diagnostic Computer 142. A similar control station is provided for Process Control Computer 144.

In operation, a batch of photographic emulsion is manufactured in the following steps. First the kettle 110 is prepared by adding a measured amount of gelatin and water and other chemical additives. Next, the process control computer 144 commands the heater 111 to heat the contents of the kettle 110 to a desired operating temperature while operating the stirring device 114. When the desired temperature is achieved, the process control computer starts the silver and salt pumps 120 and 122 and sets the valves 124 and 126 into a recycle position so that the silver and salt solutions recycle from their respective sources through valves 124 and 126 and back to their respective sources.

At a command from an operator, the process control computer commands the diagnostic computer to begin recording data from the sensors 128-140. After a predetermined interval of time, the process control computer switches valves 124 and 126 to deliver the silver and salt solutions from the respective sources to the kettle 110. As the silver and salt solutions are added to the kettle 110, the diagnostic computer 142, at certain predetermined time intervals, e.g. 1 minute, 10 minutes, 20 minutes, and end of batch calculates the values of the surrogate variables and sends the values to the process control computer 144. The process control computer 144 monitors the values of the surrogate variables and detects when the surrogate variables are out of limits.

When an out of limit condition is detected, the diagnostic computer is commanded by the process control computer to calculate the contributions by the intermediate variables to the out of limit surrogate variable. The intermediate variables with the largest contributions are identified and the contributions to the largest intermediate variables by the process variables are calculated. The process variables having the largest contributions to the identified intermediate variables are identified. Certain patterns of identified process variables are symptomatic of a particular process failure for the particular product being manufactured. As experience is obtained with the process, a library of recurring patterns related to particular failures for particular products is built up, thereby facilitating the failure analysis. Some patterns representing particular failures for a given product are known to cause unusable product. The process control computer is programmed to automatically abort the emulsion making process when these patterns are present. Other patterns not resulting in failed batches are stored and subsequently analyzed by the operator. The results of the calculations of the surrogate variables and the contributions to the surrogate variables are displayed on the operator console 148 so that the operator can diagnose the failure and correct the problem.

In the examples to follow, we employed 27 process variables. In some instances, such as instantaneous temperature readings, the process variables are determined directly from the sensor readings, in other instances, such as average values, the process variables are calculated from a number of sensor readings.

Figure 4:
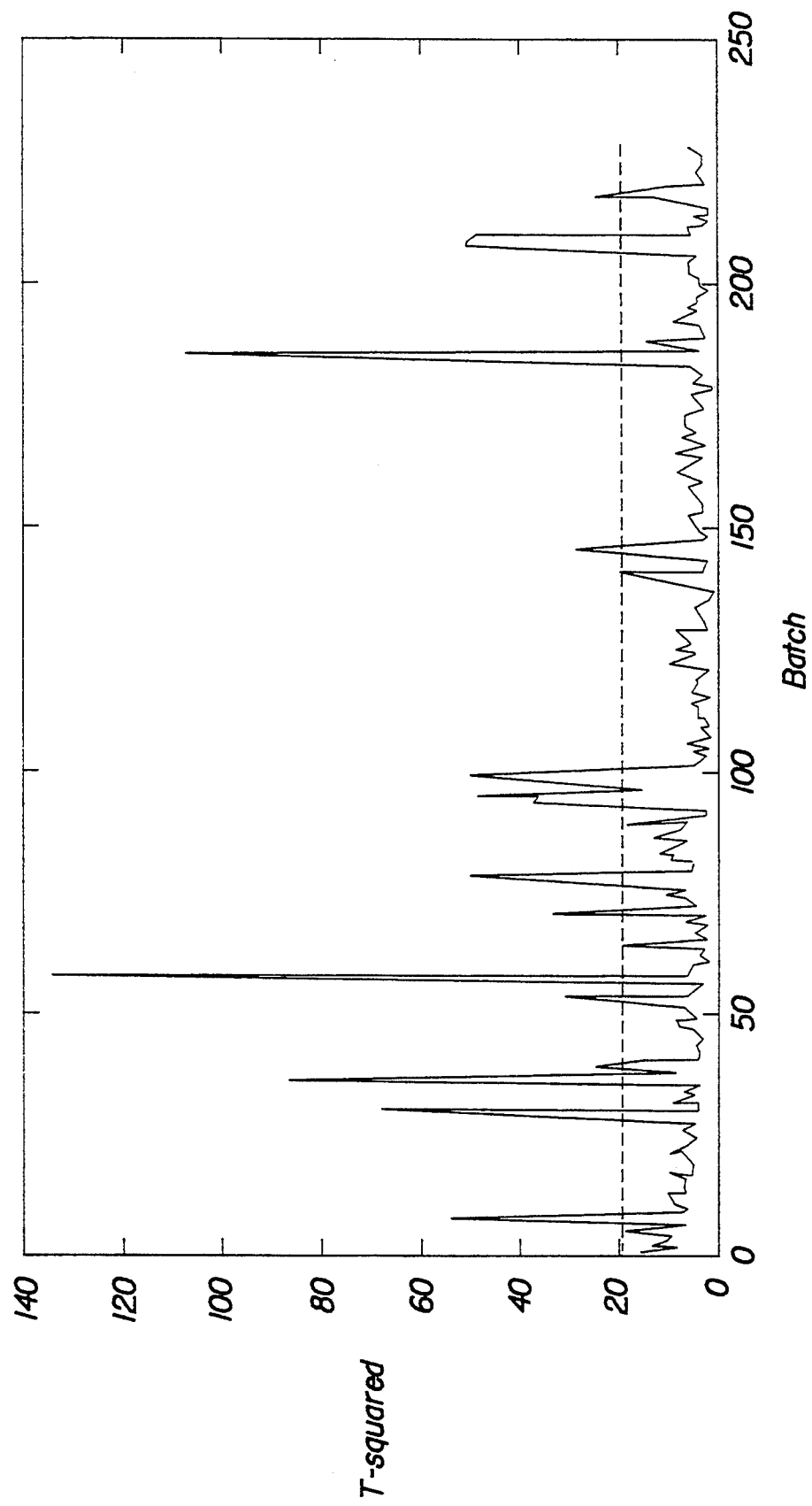
FIG. 4 is an exemplary control chart showing the value of the surrogate variable $T^2$ according to the present invention.
Figure 5:
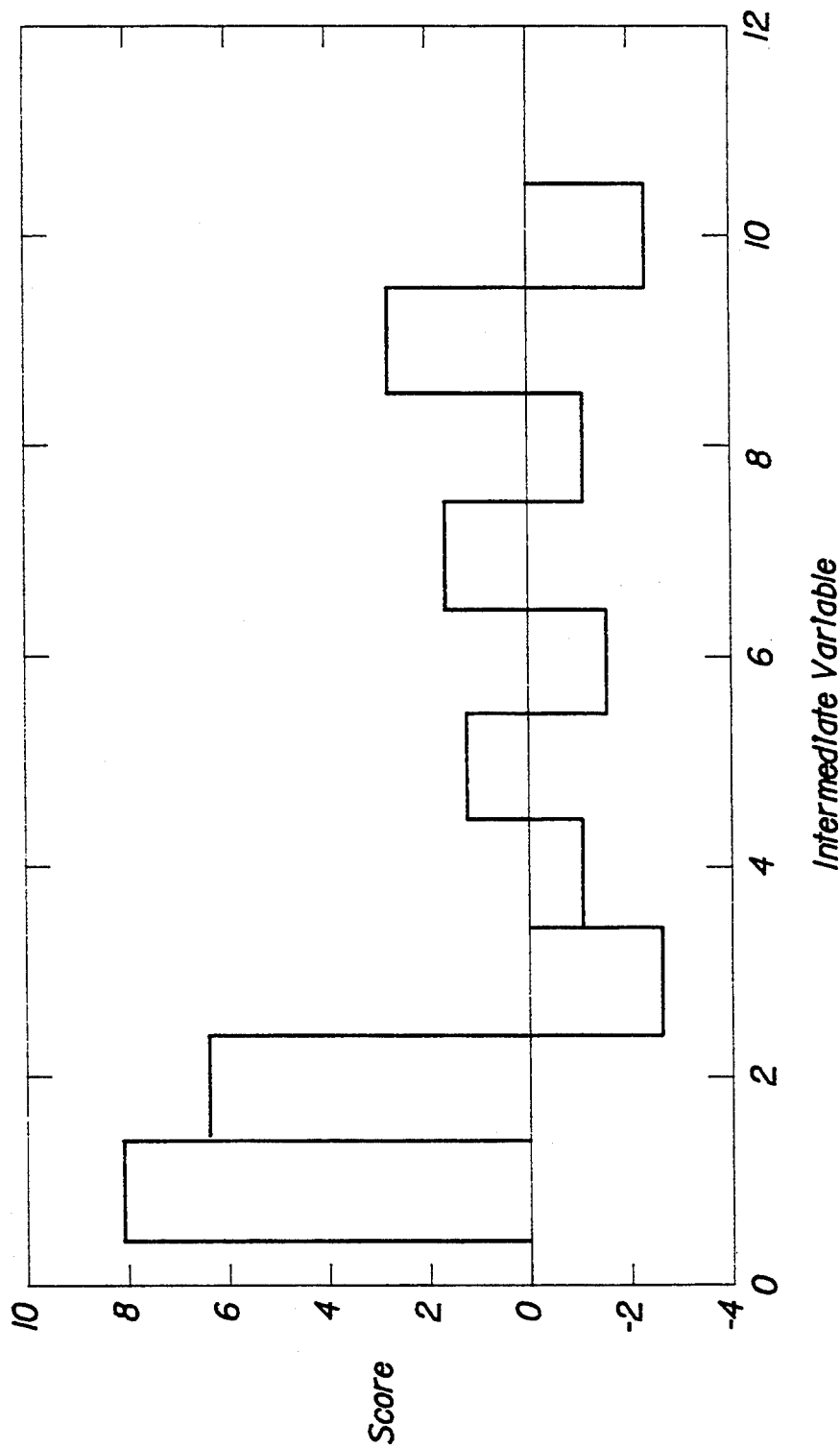
FIG. 5 is a contribution plot of the intermediate variables to the surrogate variable $T^2$.

A total of 230 batches were used to build the model of the process as represented by the loading P. A PCA model having 10 intermediate variables was constructed. A $T^2$ control chart for the set of data used to build the model is shown in FIG. 4. Several of the batches were outside the $T^2$ control limit and would have been aborted by the process control computer 144. We selected for further investigation the batch with the largest $T^2$ value, the 60th batch along the x-axis. FIG. 5, shows the contributions to $T^2$ for this batch, we see that intermediate variables 1 and 2 were the primary contributors to this batch being flagged as unusual by the $T^2$ statistic.

Example 2—Contributions to Intermediate Variables

Figure 6:
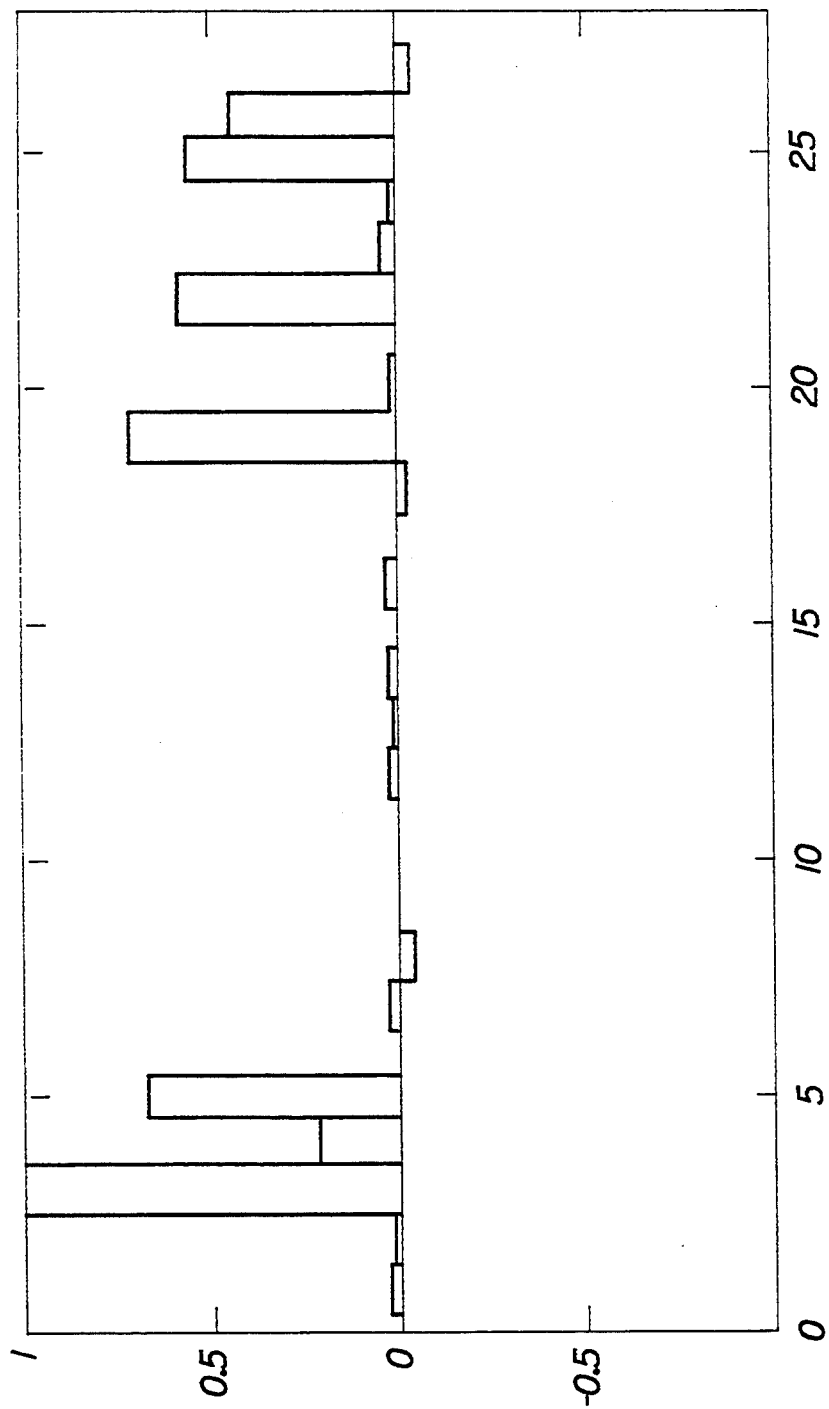
FIG. 6 is a contribution plot of the process variables to the first intermediate variable shown in FIG. 5.

FIG. 6 shows the contributions to the first intermediate variable value for batch 60. There are six big bars, corresponding to process variables 3, 5, 19, 22, 25 and 26. These variables are: silver concentration difference from setpoint during the first phase of the batch (3), difference in silver concentration measured at two different times during the first phase of the batch (5), standard deviation of silver concentration during the second phase of the batch (19), standard deviation of the salt flow during the second phase of the batch (22), total amount of salt delivered (25) and final silver concentration (26). An engineering interpretation is that the silver concentration was measured to be unusual during the first phase (according to several different variables) and during the second phase, additional salt was added to the batch to compensate, but since the final silver concentration was unusual, the compensation was not sufficient. In essence, rather than interpret the loadings for an intermediate variable, we use contribution plots to lead us to engineering interpretations of events in our history. This is a more useful way to give meaning to the mathematical intermediate variables we find.

Example 3—Residual Contributions

Figure 7:
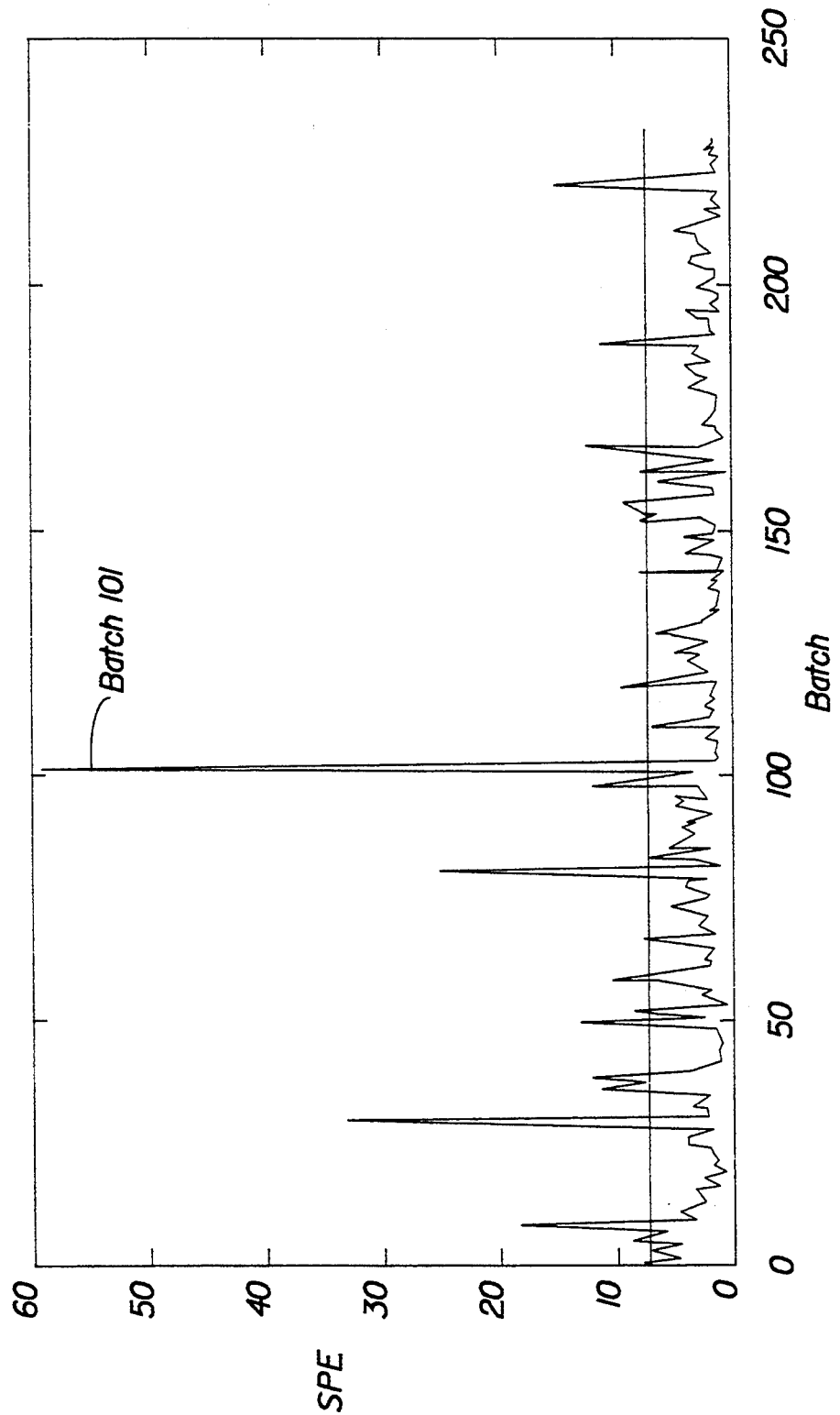
FIG. 7 is a control chart of SPE statistics.
Figure 8:
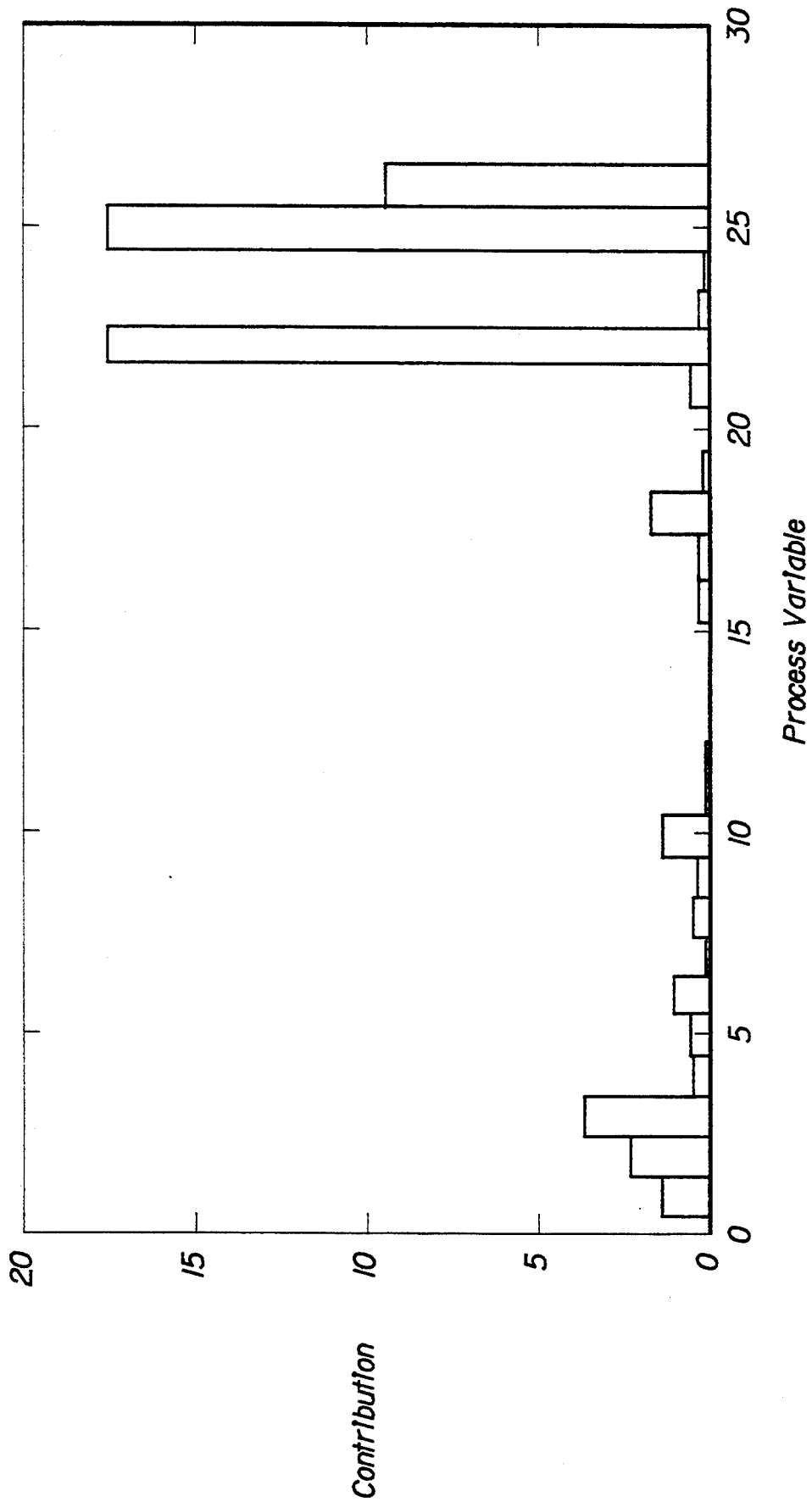
FIG. 8 is a bar graph of the process variable contributions to SPE for batch 101 in FIG. 7.

A similar analysis to the $T^2$ contributions can be done for the SPE statistic from PCA. A control chart of the SPE statistic is shown in FIG. 7. The batches with high SPE values represent occurrences not captured in our 10 intermediate variable PCA model. FIG. 8 shows the contributions to SPE for batch 101 which exhibits the highest SPE value.

We can see from FIG. 8 that variables 22, 25 and 26 were unusual in that the first 10 intermediate variables of the PCA model could not explain their behavior. Since these variables correspond to actions taken during the second phase of the batch, the engineering interpretation is that the salt flow and final silver concentration were unusual and additional attention should be focused there. It turns out that this batch was also flagged by $T^2$, and so there would be additional need to investigate based upon the contributions to the $T^2$ and scores. Such an investigation would determine that temperature control problems exist with this batch.

Example 4—Contributions to Clusters on Scatterplots

Figure 9:
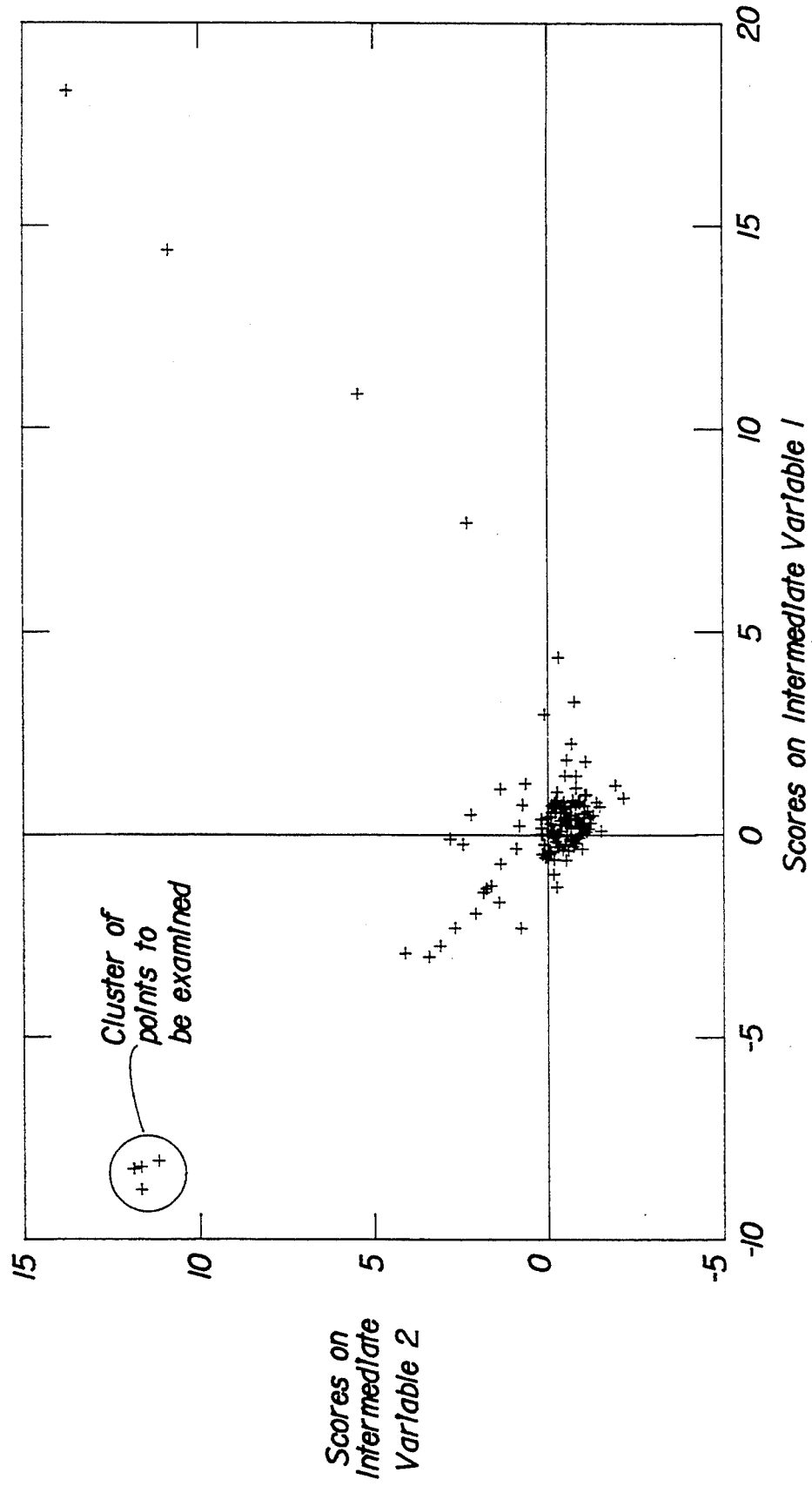
FIG. 9 is a scatter plot of intermediate variables 1 versus 2.

Another use of the contribution plots is to identify the common causes of clusters on a scatterplot of PCA scores. A scatterplot of intermediate variables 1 and 2 is shown in FIG. 9. We see a cluster of points at the top left of the plot. A contribution plot of this region's average intermediate variable values is shown in FIG. 10. Note that in FIG. 10 we show the contributions to both intermediate variable 1 and 2. In this case, the same process variables are indicated by both intermediate variables 1 and 2, but this is not always so. Process variables 12, 13, 16 and 17 are indicated by these contribution plots. Process variables 12 and 13 refer to measures of silver pressure and process variables 16 and 17 refer to measures of salt pressure, so the interpretation of the problem for this cluster of batches is that it has very different pressures in the two delivery systems.

Example 5—Contributions to Changes in Time Sequence

Figure 11:
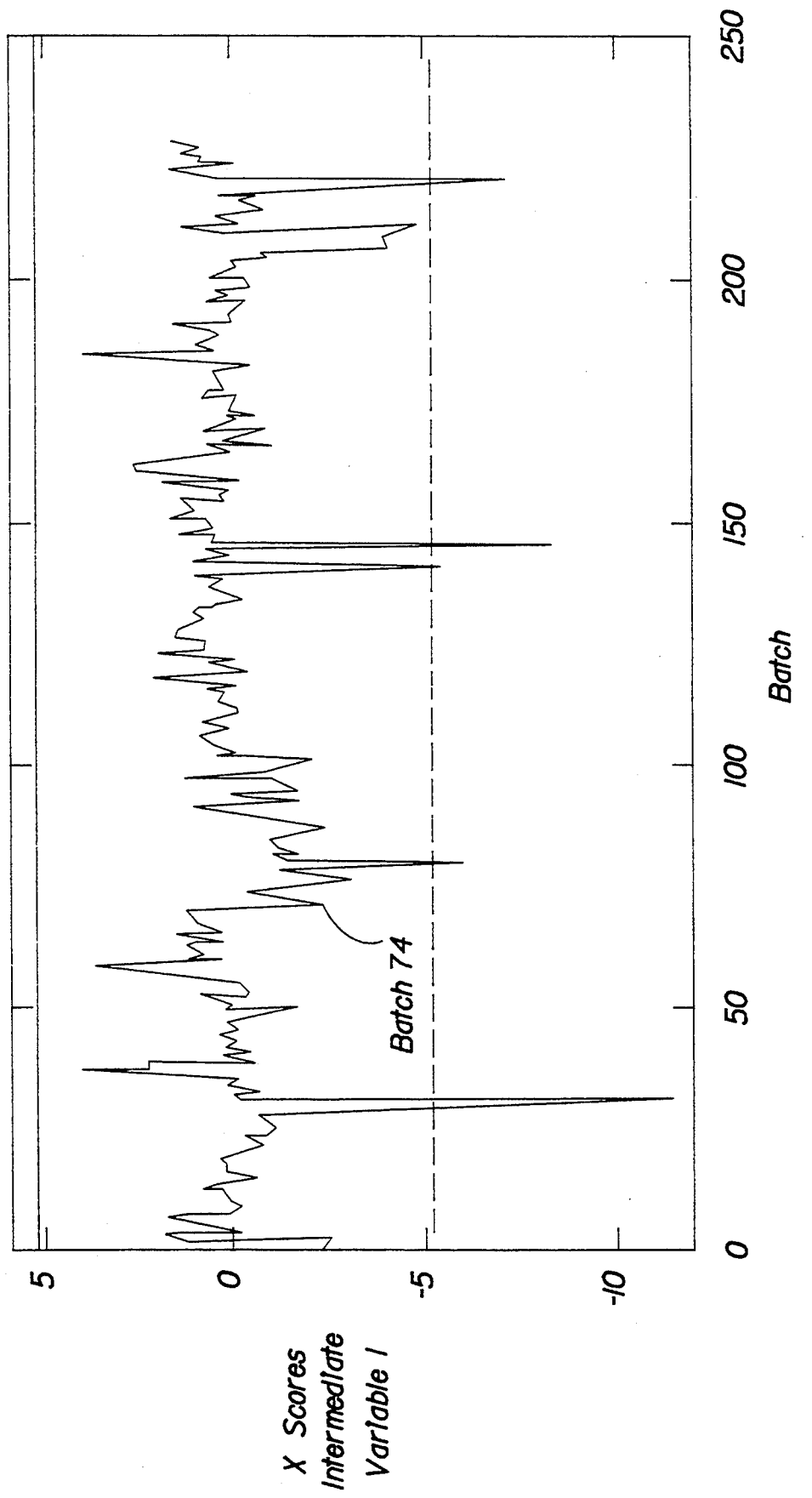
FIG. 11 is a plot of the values of intermediate variable 1 in time sequence.
Figure 12:
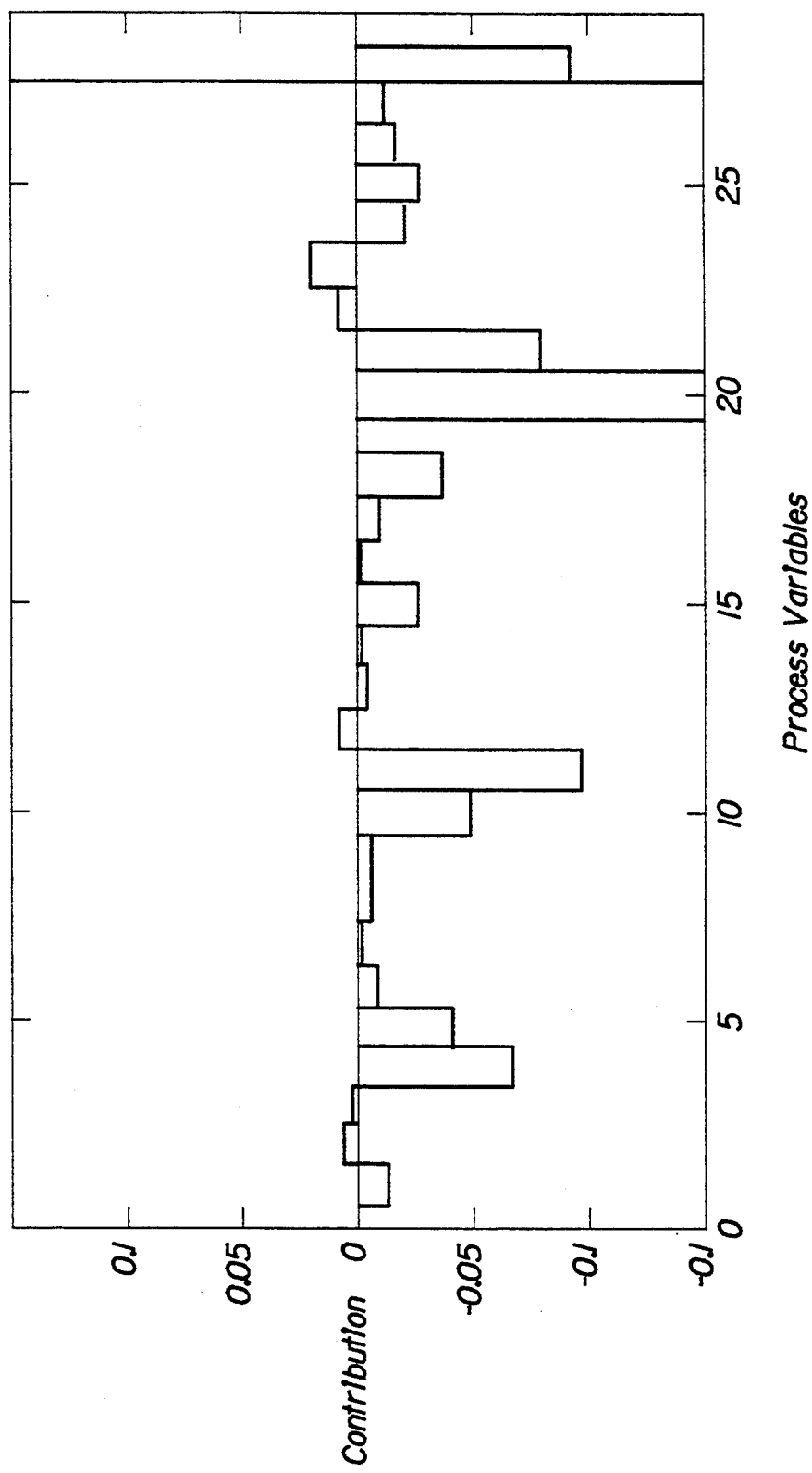
FIG. 12 is a contribution plot for process variable 1 for batches 69-78.

We present a PLS application, showing the value of intermediate variable 1 in time sequence (FIG. 11) with $3\sigma$ limits, where $\sigma$ is the standard deviation of the value for intermediate variable 1. This is in reality a control chart for the first intermediate variable. We ask the question, "What process variables changed at time 74?" (This corresponds to the downward level-shift on the plot at batch 74). Five batches before and five after are selected to determine the contributions to this process change, shown in FIG. 12. The selection of five batches before and after is problem dependent and other sample sizes could be used. Note that there is a 28th bar on the PLS contribution plots, which represents the contribution to the single product variable grain size. (Naturally, if there were multiple product variables, there would be additional bars on the contribution plots to represent this).

The process variables that changed at this point in time are process variables 11, 20 and 21 and the product variable 28. Control charts of the individual process variables and also of the product variable confirm that there indeed was a change at this point in time. The interpretation for this process change is that the deviation of the silver flow from the desired value (11) was unusual, as was a "ramp" up in both silver pressure (20) and silver flow (21) during a later part of the batch. Both the process and product changed at this point in time and so any process improvements based upon this information would be expected to produce a reduction in variability of the product. Note that it is clear from the data that the salt delivery system did not undergo changes at this point in time. Therefore, the problem with the process clearly lies elsewhere.

While the invention has been described with reference to, photographic emulsion making, it is apparent that the invention is easily adapted to other manufacturing processes that are susceptible to statistical process control.

PARTS LIST 110 kettle
111 heater jacket on kettle
112 contents of kettle
114 stirring device
116 silver nitrate solution supply
118 salt solution supply
120 silver solution pump
122 salt solution pump
124 recycle to kettle valve for silver solution
126 recycle to kettle valve for salt solution
128 silver solution pressure sensor
130 silver solution flow rate sensor
132 salt solution flow rate sensor
134 salt solution pressure sensor
136 kettle temperature sensor
138 silver concentration sensor (vAg)
140 PH sensor
142 diagnostic computer
144 process control computer
146 digital communications link
148 diagnostic display terminal
150 process control display terminal

What is claimed is:

1. A computer implemented method of controlling a manufacturing process, comprising the steps of:
   a.) during operation of the process, measuring the process with sensors of data representative of a plurality of process/product variables;
   b.) in a computer, connected to receive data from the sensors using multivariate analysis, said computer generating a surrogate variable having a value representative of whether or not the process is in control, said surrogate variable being a function of a plurality of intermediate variables, each of said intermediate variables being a weighted function of the process/product variables;

c.) when the value of the surrogate variable is outside a predetermined limit, said computer determining which of the intermediate variables primarily contributed to the value of the surrogate variable;

d.) for the intermediate variable determined in the previous step, identifying which of the process variables primarily contributed to the value of the determined intermediate variable; and e.) said computer modifying the process to change the process variable identified in the previous step to bring the value of the surrogate variable within the predetermined limit.

2. The method claimed in claim 1, wherein said multivariate analysis is Principle Component Analysis (PCA) or Partial Least Squares Analysis (PLS), and said surrogate variable is the Quantity $T_i^2$, defined as $$T_i^2 = \sum_{d=1}^{D} \frac{t_{id}^2}{\sigma_d^2},$$

where:

D is the number of intermediate variables;

$t_{id}^2$ is the square of the $d^{th}$ intermediate variable for the $i^{th}$ observation for PCA or the square of the $d^{th}$ intermediate variable for the X block for the $i^{th}$ observation for PLS;

$\sigma_d^2$ is the square of the standard deviation of the $d^{th}$ intermediate variable across all observations for PCA or the square of the standard deviation of the $d^{th}$ intermediate variable for the X block for PLS.

3. The method claimed in claim 2, wherein said step of determining which intermediate variable primarily contributed to the value of the surrogate variable, comprises calculating the contribution to $T^2$ by the intermediate variables, and selecting the intermediate variable with the largest contribution, wherein the contributions to $T^2$ are the individual terms $$\frac{t_{id}^2}{\sigma_d^2}.$$

4. The method claimed in claim 3, wherein said step of identifying which process variables primarily contributed to the determined intermediate variable comprises calculating the contribution of each process variable to the determined intermediate variable, wherein the intermediate variable is calculated according to the following equation, $$t_{id} = x_i p_d = \sum_{j=1}^{P} x_{ij} p_{jd},$$

and wherein the contributions to the intermediate variable are $x_{ij} p_{jd}$, where $x_{ij}$ is the value of the $j^{th}$ process variable for observation i and $p_{jd}$ is the loading for the $d^{th}$ intermediate variable and $j^{th}$ process variable.

5. A computer implemented method of controlling a manufacturing process, comprising the steps of:

a.) during operation of the process, measuring the process with sensors of data representative of a plurality of process/product variables;

b.) in a computer, connected to receive data from the sensors using multivariate analysis, said computer generating a surrogate variable having a value representative of the overall state of the process, said surrogate variable being a function of a plurality of intermediate variables, each of said intermediate variables being a weighted function of the process/product variables;

c.) when the value of the value of the surrogate variable is outside a predetermined limit, said computer determining which of the intermediate variables primarily contributed to the value of the surrogate variable;

d.) for the intermediate variable determined in the previous step, identifying which of the process variables primarily contributed to the value of the determined intermediate variable;

e.) comparing the pattern of process variables determined in the previous step to a known pattern of process variables representing a particular process failure;

f.) when a match of said patterns of process variables is made, stopping the process; and g.) said computer modifying the process to change the process variables identified in the previous step to correct said particular process failure.

6. The method claimed in claim 5, wherein said multivariate analysis is Principle Component Analysis (PCA) or Partial Least Squares Fit (PLS), and said surrogate variable is the Quantity $T_i^2$, defined as $$T_i^2 = \sum_{d=1}^{D} \frac{t_{id}^2}{\sigma_d^2},$$

where:

D is the number of intermediate variables;

$t_{id}^2$ is the square of the $d^{th}$ intermediate variable for the $i^{th}$ observation for PCA or the square of the $d^{th}$ intermediate variable for the X block for the $i^{th}$ observation for PLS;

$\sigma_d^2$ is the square of the standard deviation of the $d^{th}$ intermediate variable across all observations for PCA or the square of the standard deviation of the $d^{th}$ intermediate variable for the X block for PLS.

7. The method claimed in claim 6, wherein said step of determining which intermediate variable primarily contributed to the value of the surrogate variable, comprises calculating the contribution to $T^2$ by intermediate variable, and selecting the intermediate variable with the largest contribution, wherein the contribution to $T^2$ are the individual terms $$\frac{t_{id}^2}{\sigma_d^2}.$$

8. The method claimed in claim 7, wherein said step of identifying which process variables primarily contributed to the determined intermediate variable comprises calculating the contribution of each process variable to the determined intermediate variable and selecting those process variable whose contribution values are above a certain predetermined limit.

9. The method claimed in claim 8, wherein the intermediate variable is calculated according to the following equation, $$t_{id} = x_i p_d = \sum_{j=1}^{P} x_{ij} p_{jd},$$

and wherein the contributions to the intermediate variable are $x_{ij}p_{jd}$, where $x_{ij}$ is the value of the $j^{th}$ process variable for observation i and $p_{jd}$ is the loading for the $d^{th}$ intermediate variable and $j^{th}$ process variable.

10. A computer implemented method of controlling a process, comprising the steps of:
 a.) during operation of the process, measuring the process with sensors of data representative of a plurality of process/product variables;
 b.) in a computer, connected to receive data from the sensors using multivariate analysis, generating a surrogate variable having a value representative of whether or not the process is in control, said surrogate variable being a function of a plurality of intermediate variables, each of said intermediate variables being a weighted function of the process/product variables;
 c.) when the value of the surrogate variable is outside a predetermined limit, said computer determining which of the intermediate variables primarily contributed to the value of the surrogate variable;
 d.) for the intermediate variable determined in the previous step, identifying which of the process variables primarily contributed to the value of the determined intermediate variable; and
 e.) said computer modifying the process to change the process variable identified in the previous step to bring the value of the surrogate variable within the predetermined limit.

11. The method claimed in claim 10, wherein said multivariate analysis is Principle Component Analysis (PCA) or Partial Least Squares Analysis (PLS), and said surrogate variable is the Quantity $T_i^2$, defined as $$T_i^2 = \sum_{d=1}^{D} \frac{t_{id}^2}{\sigma_d^2},$$

where:
 D is the number of intermediate variables;
 $t_{id}^2$ is the square of the $d^{th}$ intermediate variable for the $i^{th}$ observation for PCA or the square of the $d^{th}$ intermediate variable for the X block for the $i^{th}$ observation for PLS;
 $\sigma_d^2$ is the square of the standard deviation of the $d^{th}$ intermediate variable across all observations for PCA or the square of the standard deviation of the $d^{th}$ intermediate variable for the X block for PLS.

12. The method claimed in claim 11, wherein said step of determining which intermediate variable primarily contributed to the value of the surrogate variable, comprises calculating the contribution to $T^2$ by the intermediate variables, and selecting the intermediate variable with the largest contribution, wherein the contributions to $T^2$ are the individual terms $$\frac{t_{id}^2}{\sigma_d^2}.$$

13. The method claimed in claim 12, wherein said step of identifying which process variables primarily contributed to the determined intermediate variable comprises calculating the contribution of each process variable to the determined intermediate variable, wherein the intermediate variable is calculated according to the following equation, $$t_{id} = x_i p_d = \sum_{j=1}^{p} x_{ij} p_{jd},$$

and wherein the contributions to the intermediate variable are $x_{ij}p_{jd}$, where $x_{ij}$ is the value of the $j^{th}$ process variable for observation i and $p_{jd}$ is the loading for the $d^{th}$ intermediate variable and $j^{th}$ process variable.

14. A computer implemented method of controlling a process, comprising the steps of:
 a.) during operation of the process, measuring the process with sensors of data representative of a plurality of process/product variables;
 b.) in a computer, connected to receive data from the sensors using multivariate analysis, generating a surrogate variable having a value representative of the overall state of the process, said surrogate variable being a function of a plurality of intermediate variables, each of said intermediate variables being a weighted function of the process/product variables;
 c.) when the value of the value of the surrogate variable is outside a predetermined limit, said computer determining which of the intermediate variables primarily contributed to the value of the surrogate variable;
 d.) for the intermediate variable determined in the previous step, identifying which of the process variables primarily contributed to the value of the determined intermediate variable;
 e.) comparing the pattern of process variables determined in the previous step to a known pattern of process variables representing a particular process failure;
 f.) when a match of said patterns of process variables is made, stopping the process; and
 g.) said computer modifying the process to change the process variables identified in the previous step to correct said particular process failure.

15. The method claimed in claim 14, wherein said multivariate analysis is Principle Component Analysis (PCA) or Partial Least Squares Fit (PLS), and said surrogate variable is the Quantity $T_i^2$, defined as $$T_i^2 = \sum_{d=1}^{D} \frac{t_{id}^2}{\sigma_d^2},$$

where:
 D is the number of intermediate variables;
 $t_{id}^2$ is the square of the $d^{th}$ intermediate variable for the $i^{th}$ observation for PCA or the square of the $d^{th}$ intermediate variable for the X block for the $i^{th}$ observation for PLS;
 $\sigma_d^2$ is the square of the standard deviation of the $d^{th}$ intermediate variable across all observations for PCA or the square of the standard deviation of the $d^{th}$ intermediate variable for the X block for PLS.

16. The method claimed in claim 15, wherein said step of determining which intermediate variable primarily contributed to the value of the surrogate variable, comprises calculating the contribution to $T^2$ by intermediate variable, and selecting the intermediate variable with the largest contribution, wherein the contribution to $T^2$ are the individual terms $$\frac{t_{id}^2}{\sigma_d^2}.$$

17. The method claimed in claim 16, wherein said step of identifying which process variables primarily contributed to the determined intermediate variable comprises calculating the contribution of each process variable to the determined intermediate variable and selecting those process variable whose contribution values are above a certain predetermined limit.

18. The method claimed in claim 17, wherein the intermediate variable is calculated according to the following equation, $$t_{id} = x_i p_d = \sum_{j=1}^{p} x_{ij} p_{jd},$$

and wherein the contributions to the intermediate variable are $x_{ij}p_{jd}$, where $x_{ij}$ is the value of the $j^{th}$ process variable for observation i and $p_{jd}$ is the loading for the $d^{th}$ intermediate variable and $j^{th}$ process variable.

* * * * *